United States Patent
Ebadollahi et al.

(10) Patent No.: US 8,032,539 B2
(45) Date of Patent: Oct. 4, 2011

(54) METHOD AND APPARATUS FOR SEMANTIC ASSISTED RATING OF MULTIMEDIA CONTENT

(75) Inventors: Shahram Ebadollahi, White Plains, NY (US); Milind Naphade, Fishkill, NY (US); Apostol Ivanov Natsev, Harrison, NY (US); John Richard Smith, New Hyde Park, NY (US); Ioana Roxana Stanoi, San Jose, CA (US); Jelena Tesic, New York, NY (US); Lexing Xie, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 12/046,206

(22) Filed: Mar. 11, 2008

(65) Prior Publication Data

US 2009/0234831 A1    Sep. 17, 2009

(51) Int. Cl.
  *G06F 17/30* (2006.01)
(52) U.S. Cl. ....... 707/754; 707/748; 705/7.29; 705/26.7
(58) Field of Classification Search ............ 705/10, 705/14.19, 14.2, 26, 7.29, 26.1, 26.29, 26.35, 705/26.61, 26.7; 725/14; 707/600, 705, 707/708, 723, 726, 752, 754, 758, 767, E17.109, 707/732–734, 736–740, 748–749, 770–771, 707/999.005
See application file for complete search history.

(56) References Cited

U.S. PATENT DOCUMENTS

| | | | | |
|---|---|---|---|---|
| 5,867,799 A * | 2/1999 | Lang et al. | | 1/1 |
| 6,092,049 A * | 7/2000 | Chislenko et al. | | 705/10 |
| 6,785,671 B1 * | 8/2004 | Bailey et al. | | 1/1 |
| 7,430,561 B2 * | 9/2008 | Bailey et al. | | 1/1 |
| 7,747,680 B2 * | 6/2010 | Ravikumar et al. | | 709/203 |
| 2008/0071602 A1 * | 3/2008 | Ojakaar et al. | | 705/10 |
| 2008/0162540 A1 * | 7/2008 | Parikh et al. | | 707/102 |
| 2009/0063247 A1 * | 3/2009 | Burgess et al. | | 705/10 |

* cited by examiner

*Primary Examiner* — Greta Robinson
(74) *Attorney, Agent, or Firm* — Yee & Associates, P.C.; Preston J. Young

(57) ABSTRACT

The present invention is directed to a method and apparatus for assisting in rating and filtering multimedia content, such as images, videos and sound recordings. One embodiment comprises a computer implemented method for rating the objectionability of specified digital content that comprises one or more discrete content items, wherein the method includes the step of moving the specified content to one or more filtering stages in a succession of filtering stages. After the specified content is moved to a given one of the filtering stages, a rating procedure is carried out to determine whether a rating can be applied to one or more of the content items, and if so, a selected rating is applied to each of the one or more content items. The method further comprises moving content items of the specified content to the next stage in the succession after the given stage, when at least one content item of the specified content remains without rating, after the rating procedure at the given stage. When none of the content items of the specified content remains without a rating after the rating procedure has been completed at the given stage, ratings that have been respectively applied to at least some of the content items are selectively processed, in order to determine an overall objectionability rating for the specified content.

20 Claims, 4 Drawing Sheets

METHOD AND APPARATUS FOR SEMANTIC ASSISTED RATING OF MULTIMEDIA CONTENT

BACKGROUND OF THE INVENTION

1. Field of the Invention

The invention disclosed and claimed herein generally pertains to a method and apparatus for assisting users in rating objects of multimedia content, such as images, videos and audio recordings, for objectionable content or subject matter. More particularly, the invention pertains to a method of the above type wherein discrete or individual content items are respectively scored or rated, in order to determine the rating that they should each be given in a rating scheme or structure. Even more particularly, the invention pertains to a method of the above type wherein a specified multimedia object, comprising a number of discrete content items, is moved through a succession of filtering stages, and different semantic procedures are used at different stages to rate respective content items.

2. Description of the Related Art

Rich media, such as text, audio, image and video, are used to freely communicate messages in computer-based communications. As increasing numbers of people across age groups and with diverse cultural backgrounds access on-line digital media objects, there is a growing need to filter sensitive content. For example, parents need tools for managing access of their children to potentially harmful videos, in an environment where what is "harmful" varies in different cultures, but content is available across geographical and cultural boundaries.

Ratings are presently used by the entertainment industry to provide a recommendation system for video content classifications, such as for films, television programs, games and the like. However, this approach to ratings is generally manual, time consuming and inflexible. As TV broadcasting moves toward the Internet Protocol Television (IPTV) model, the boundaries between web content and television content, as well as the boundaries between content created by industry and content created by users, will steadily diminish and ultimately disappear. Moreover, geographical boundaries in content creation and consumption will likewise disappear. That is, videos will be acquired, edited, uploaded and viewed not only locally, but on a global basis as well.

Currently used rating systems are not very adaptable to these anticipated changes. Current technologies protect against access to objectionable websites by using text-based filters and various recommendation systems, and professional video creators have generally been responsible for providing content descriptors that are the basis of the ratings. However, these systems are limited by completeness, in that the manual descriptor-rating schemes remain incomplete and are frequently not enforced. Such systems are also of limited efficiency. It is not possible to have reliable ratings, where very large amounts of data are involved (e.g., all videos on YouTube.com), in an arrangement wherein both the content descriptors and the ratings are provided manually. In addition, the prior art systems are of limited accuracy, since both the description and the ratings are done for the whole video. As a result, it is not possible to guarantee that the ratings are accurate for all segments of the video. Some sensitive content may appear only in the middle of the video clip, and there is no auditing mechanism to check the completeness and accuracy of the descriptors. Finally, it would be desirable for a rating system to be flexible enough to accommodate different international standards, and adjust to the backgrounds and preferences of video consumers on a global basis. Presently available systems do not provide this flexibility. Moreover, currently employed approaches such as human processing do not scale.

While automatic solutions are currently being proposed as alternatives to manual processing, these solutions fall into one of two main approaches. These are (1) duplicate detection and removal, exemplified by U.S. Pat. No. 6,381,601, and (2) low-level image analysis operations like detecting skin color pixels, as exemplified by U.S. Pat. Nos. 6,895,111 and 7,027,645. However, there are a number of drawbacks to these proposed automatic systems: (1) Skin detection and image filtering based on these operations is computationally intensive, and is also error prone with limited accuracy. Moreover, skin detection is best suited for detecting nudity, and does not address other types of sensitive content or objectionability, such as violence, gore or hate. (2) Removing duplicates by matching to known content requires developing and maintaining large databases. It will be impossible to rate new content using a comparison approach, since the system will not contain prior content that will match the new content. (3) Ratings of suitability tend to be based on a very limited assessment of objectionability, which is not related to the semantics of the content. (4) Any rating and filtering schemes that rely on human reviewers are manually intensive, do not scale, and offer a fixed and relatively small number of categories. As an example, the well known rating system of the Motion Picture Association of America (MPPA) is limited to ratings such as G, PG, PG-13 and R.

SUMMARY OF THE INVENTION

One embodiment of the invention is directed to a computer implemented method for rating the objectionability of specified digital content that comprises one or more discrete content items, wherein the method includes the step of moving the specified content to one or more filtering stages in a succession of filtering stages, the last stage of the succession being designated as the final stage thereof. After the specified content is moved to a given one of the filtering stages, a rating procedure is carried out to determine whether a rating can be applied to one or more of the content items, and if so, a selected rating is applied to each of the one or more content items. The method further comprises moving content items of the specified content to the next stage in the succession after the given stage, when at least one content item of the specified content remains without rating, after the rating procedure has been completed at the given stage. When none of the content items of the specified content remains without a rating after the rating procedure has been completed at the given stage, ratings that have been respectively applied to at least some of the content items are selectively processed, in order to determine an overall objectionability rating for at least a portion of the specified content.

BRIEF DESCRIPTION OF THE DRAWINGS

The novel features believed characteristic of the invention are set forth in the appended claims. The invention itself, however, as well as a preferred mode of use, and further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

In order to rate the content of multimedia objects for objectionability, by means of a procedure that is complete, scalable and accurate, embodiments of the invention usefully have the following characteristics or capabilities:
1. Embodiments make use of computer technology to assist in the learning and extraction of pertinent semantic information.
2. Embodiments are able to accurately localize the ratings to sub-segments of the multimedia objects, for example, to each video shot or frame of an object that comprises a film or video.
3. Embodiments are able to determine a level of objectionability for different types of objectionability, such as violence, gore, nudity and hate.
4. Embodiments are able to assist manual processing by reducing workload and increasing the speed of processing, which are both key metrics.
5. Embodiments are flexible enough to accommodate different international standards, and can adjust to different geographical or cultural codes or personal preferences.

In embodiments of the invention, computers are used to process large volumes of digital content, in order to determine ratings therefore. Also, semantic analysis is applied to model a wide range of concepts related to content, and to learn the association of objectionability to extracted semantic elements. As is known by those of skill in the art, and as used herein, the terms "semantics" and "semantic elements" are used to mean or refer to wording, text or other data elements that describe or define characteristics or features of a multimedia object.

In accordance with embodiments of the invention, it is recognized that a multimedia object may comprise a number of discrete content items, wherein each item is evaluated individually using an automated process, in order to rate the objectionability thereof. For example, if the multimedia object is a movie or other video, it will generally comprise a number of individual frames, and also an audio soundtrack. Other multimedia objects could include discrete content items comprising audio segments of speech or music, or portions of text, and could further include pictures or other graphic images. In useful embodiments, the content items of a multimedia object are evaluated at each of a plurality of filtering stages, wherein each stage employs a different semantic criterion to evaluate objectionability. If an individual content item is found to be either objectionable or non-objectionable at any given stage before the final stage, it is filtered out at the given stage, as further described hereinafter. Content items that reach the final stage without being previously rated for objectionability are evaluated by means of a semantic categorization and scoring procedure, as likewise described hereinafter.

Figure 1:
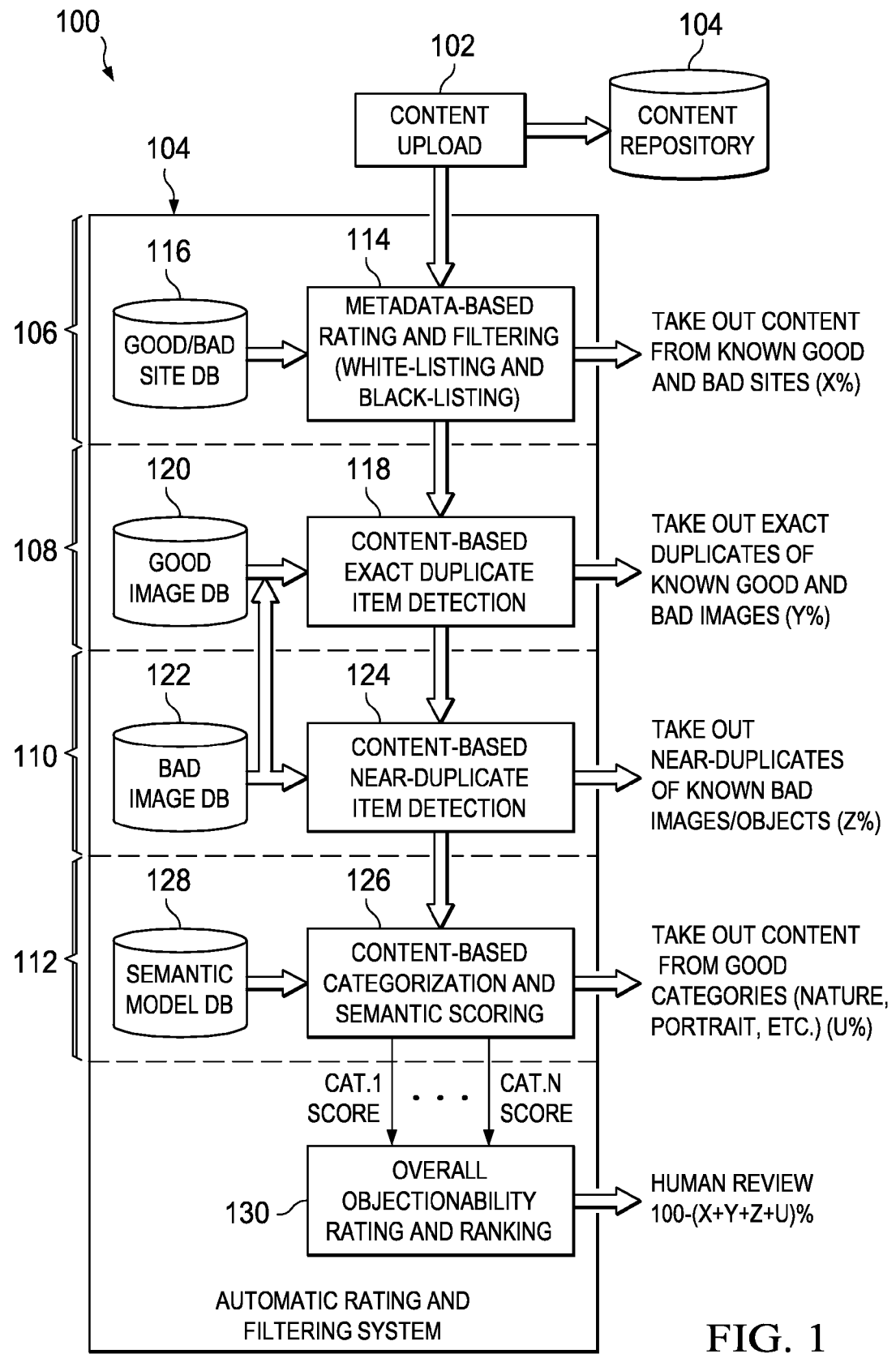
FIG. 1 is a schematic diagram showing respective components for an embodiment of the invention.

Referring to FIG. 1, there is shown a schematic diagram that depicts an automated multi-stage content rating and filtering system 100, adapted to operate in accordance with the concepts described above. A content upload device 102 for system 100 comprises a software component that accepts multimedia content, for publication online or for distribution to users. Content upload device 102 provides a comparatively simple mechanism for enabling users to upload multimedia content, in the form of specific multimedia objects such as images, videos, sound recordings or textual materials, for storage in a content repository 104. Content from repository 104 can then be used for purposes such as content sharing or online publishing on the World Wide Web. Rating and filtering system 100 analyzes each multimedia object from the content repository 104, and screens the content of the object for objectionable aspects such as violence, gore, nudity and undesirable language. System 100 also rates and filters out individual contents of the object which are found to be definitely objectionable and definitely non-objectionable. The content rating and filtering system 100 employs a multi-stage filtering configuration that comprises filtering stages 106-110 and a final stage 112.

Stage 106 is provided with a metadata based component 114, which is used to search respective content items for metadata or external information associated with the multimedia object being analyzed by system 100. Such metadata could include, without being limited thereto, content file names or descriptions, the Uniform Resource Locator (URL) of the object, the owner thereof, or the originating World Wide Web site. By means of the metadata, content items could be definitely or categorically rated as being objectionable, as definitely being non-objectionable or safe, or as being of unknown rating. For example, all image or video objects originating from a known pornographic website could be automatically rated as being objectionable at stage 106, without further analysis of the image or video. This determination would be made by comparing object source or site information with data maintained in a repository or database 116, containing lists of known objectionable and non-objectionable websites, or "black lists" and "white lists", respectively. For clarity, FIG. 1 uses the terms "good" and "bad" to identify object content that is non-objectionable and objectionable, respectively.

FIG. 1 shows that content items of an object being analyzed, which are found at stage 106 to be from either good or bad sites, collectively represent X % of the object content. These items are filtered out at stage 106, in the sense that they each require no further processing to assess objectionability thereof.

At stage 108, a device 118 processes respective content items to find any such items that match, or are exactly identical to "good" and "bad" duplicate content items stored in databases 120 and 122, respectively. The stored duplicate items usefully can be video images, for comparison with content items that are in the form of videos, pictures or graphic images. However, the duplicate items could also be words or terms, in the form of printed text or sound recordings, for comparison with content items of corresponding forms.

The "good" and "bad" items stored in databases 120 and 122 may duplicate images or other items that were previously identified as either safe or objectionable by human assessment, or by automatic rating and filtering system 100. Alternatively, the stored duplicate items may be provided by third party companies specializing in the collection and management of "white lists" and "black lists" of known "good" and "bad" images or other items, respectively. The purpose of the exact duplicate item detection device 118 is to identify content items that are exact bit-for-bit copies of the known "good" or "bad" items. Accordingly, detection device 118 may employ digital fingerprinting and hashing technologies, such as those based on MD5 checksums. Content items that are identified as exact duplicates of stored items with known objectionability status can thus be immediately classified as either safe or objectionable, and can then be removed from further processing by system 100. FIG. 1 shows these items filtered at stage 108 as representing Y % of the object content.

At stage 110, a near-duplicate item detection device 124 identifies content images that are not exact bit-for-bit duplicates of known content items stored in database 122, but are "near-duplicates" of such stored items. As used herein, "near-duplicate items" are items in the form of images that depict the same scene, setting or objects, but are obtained by different cameras, at slightly different viewpoints or at different times, than images stored in database 122. Alternatively, the near-duplicate images may be copies of the same source images that are stored in database 122, but after digital manipulations have been applied thereto. Examples of such digital manipulations include but are not limited to re-encoding and compression, color intensity, hue, saturation manipulation, and artificial graphics or object superposition of an image, as well as other digital image transformations that are known to those of skill in the art.

Content images that are identified as being near-duplicates of other items of known objectionability status can be immediately classified as being either safe or objectionable, and thus can be removed from further processing. The near-duplicate item detection device 124 is able to compare unknown content items to the "good" and "bad" duplicate items stored in the "good" and "bad" item databases 120 and 122, respectively, as described above for stage 108. However, for computational considerations and enhanced accuracy, it is generally desirable that the near-duplicate comparisons are performed only against "bad" images and other items. FIG. 1 shows items filtered at stage 110 as representing Z % of the object content.

Referring further to FIG. 1, there is shown a rating and filtering stage 112 provided with a content based categorization and semantic scoring module 126. If a content item is not rated at any of the stages 106-110 as described above, module 126 analyzes the semantics of the item and classifies the item into one or more fixed semantic categories. The set of semantic categories includes some categories that are deemed to be non-objectionable, such as categories for content pertaining to portraits, scenes and objects of nature, and sports. Other semantic categories, for content pertaining to things such as violence, gore, nudity and hate, are deemed to be objectionable. Some of the semantic categories are deemed to be only contextual, or correlated for the purpose of determining levels of objectionability. These include categories for content pertaining to image type (e.g., color photographs, black and white photographs, graphics and art), indoor settings, outdoor settings, human faces and crowd presence.

When a content item has been assigned to a semantic category, module 126 applies a score to the content item. The score may indicate that the content item is definitely objectionable, or is definitely not objectionable, or may provide a numerical value associated with objectionability. For example, the score could be a number representing the amount of human skin depicted in an image, and combined with contextual information could indicate an unacceptable level of nudity. Similarly, a number representing an amount of blood shown by the image could indicate an unacceptable level of gore or violence. In selecting categories for content items and applying scores thereto, categorization and scoring module 126 can make use of semantic models stored in a repository or database 128. As described hereinafter in further detail in connection with FIG. 2, database 128 contains machine-readable representations, such as statistical models and learning models, of the fixed semantic categories.

In one embodiment, placing a content item in a particular category automatically assigns a particular predetermined score to the content item. In one such embodiment, the set of semantic categories corresponds directly to movie or video game ratings of a known rating structure, such as the film rating system of the Motion Pictures Association of America (MPAA), with ratings of G, PG, PG-13 and the like. A content item placed into a particular category would then have a score that was the particular rating assigned to that category. In another embodiment, the content-based categorization and semantic scoring module 126 makes use of human reviews, ratings and recommendations. For example, a set of semantic ratings could consist of the reviews assigned to photographs or videos by a particular group of human editors, professional reviewers, or general users.

FIG. 1 further shows content items of definitely non-objectionable semantic categories, collectively representing U % of the object content, filtered at stage 112. The representative scores of content items in other categories (categories 1-N) are sent to an overall objectionability rating and ranking device 130. Device 130 then processes the score for all categories 1-N collectively, to determine a single overall objectionability rating for the content items of the original multimedia object that were not filtered at any of the stages 106-112, as described above.

In one embodiment, the mapping of the set of semantic categories and scores into the overall objectionability rating or score is learned using training data and machine learning techniques. For example, computation of the overall objectionability rating may use an algorithm, which calculates the overall rating to be the ratio of a maximum objectionable category confidence over a maximum safe category confidence. Thus, the objectionability rating is a fusion of scores from both objectionable categories. In other embodiments, derivation of the overall objectionability rating may be skewed or adapted to accommodate different objectionable standards of different users, families, content providers or geographic locations.

Objectionability ratings provided by module 126, representing the likelihood that content items in categories 1-N are objectionable, can also be used to provide a ranking, in order to prioritize content for human review of objectionability. For example, content items in categories with the highest objectionability scores would be given highest priority for human review. Moreover, it will be appreciated that for a given multimedia object, system 100 automatically filters out a large portion of the content thereof, at stages 106-112, as being definitely objectionable or as being definitely non-objectionable. This portion collectively comprises the content amounts X %, Y %, Z % and U %. Only the remainder of the content, rated and ranked by device 130, would therefore need to be considered for human review. It is thus seen that the design of the system 100 allows better scalability and higher speed of removal of objectionable content, due to the smaller amounts of data that need to be screened manually, and also due to the automatic prioritization for human review.

In another embodiment, ratings of content items at stages 106-112 may also be used by device 130 in providing an overall objectionability rating of the original multimedia object, or portion thereof.

Figure 2:
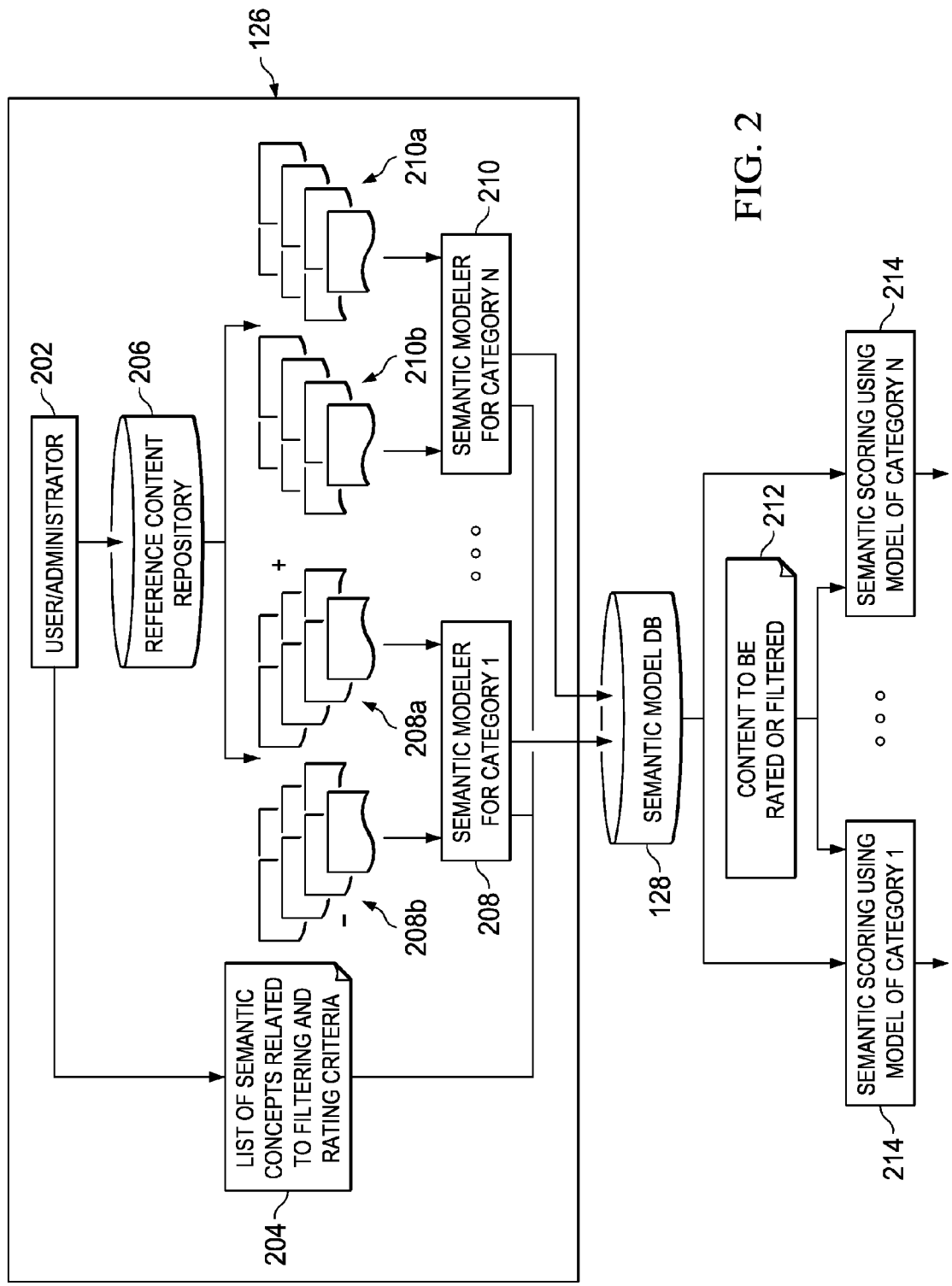
FIG. 2 is a schematic diagram illustrating certain components of FIG. 1 in further detail.

Referring to FIG. 2, there is shown content based category and semantic scoring module 126. In module 126, a user/administrator 202 makes a comprehensive determination of the semantic concepts or dimensions that are relevant to filtering specified content, and to rating or scoring the content for objectionability. These concepts are placed into a list 204, and are used to prepare semantic models for each of the categories 1-N, referred to above. Some of the semantic concepts or dimensions pertain to categories for objectionable or controversial content, such as content pertaining to violence or nudity. Other semantic concepts pertain to non-objectionable or neutral content, such as sports, natural scenes or animals. Yet other semantic concepts could pertain to categories that are correlated to genre, source or specified metadata.

For each semantic concept placed in list 204, the collection of multimedia examples or exemplars, which illustrate or depict the concept, are added to a reference content repository 206. For a certain non-objectionable categories of video images, exemplars could include natural outdoor scenes such as forest or ocean beach scenes, or scenes involving animals. Exemplars for a category pertaining to images of graphic violence could include scenes or images taken from prior movies known to depict such content. For categories pertaining to audio or textual content, exemplars could include words and statements in corresponding form that are considered to be objectionable or non-objectionable. The exemplars or other multimedia content deposited in repository 206 could, for example, be obtained from the World Wide Web, or by screening previously evaluated content.

Using the exemplars contained in repository 206, a semantic content model is created, such as by statistical models or machine-learning models, for each semantic concept defined in the list 204. The resulting models are deposited in the semantic model database 128 for use in rating, ranking and filtering the content provided by a user of the content rating and filtering system 100. FIG. 2 shows modelers 208 and 210, for constructing semantic models pertaining to category 1 and category N, respectively. In constructing a model, it may be useful to have exemplars that pertain to content that is both relevant and irrelevant for a particular category. Thus, FIG. 2 shows relevant exemplars 208a and 210a for categories 208 and 210, respectively, and further shows irrelevant exemplars 208b and 210b therefor. For example, category 208 may be "pictures containing face", exemplar 208a is a passport photo or mugshot, and exemplar 208b is a picture of a building with nobody in it.

Referring further to FIG. 2, there is shown an input 212 for received content to be rated or filtered from filtering stage 110 of system 100. At each of a number of scoring modules 214, one corresponding to each category 1-N, the received content is scored against the semantic model stored in database 128 for the corresponding category. The resulting scores provide the input to objectionability rating and ranking device 130, as described above in connection with FIG. 1. In one embodiment, the entire semantic content modeling process, as described in connection with FIG. 2, could be performed off-line, prior to ranking and filtering incoming content. Also, the definition of the relevant semantic concepts as stored in list 204, as well as the referenced multimedia exemplars stored in repository 206, could be updated as the user sees the results of the filtering and ranking process provided by the system of FIG. 1. This would enable the semantic models used in the system to be tuned, in order to improve the ranking and filtering results.

Figure 3:
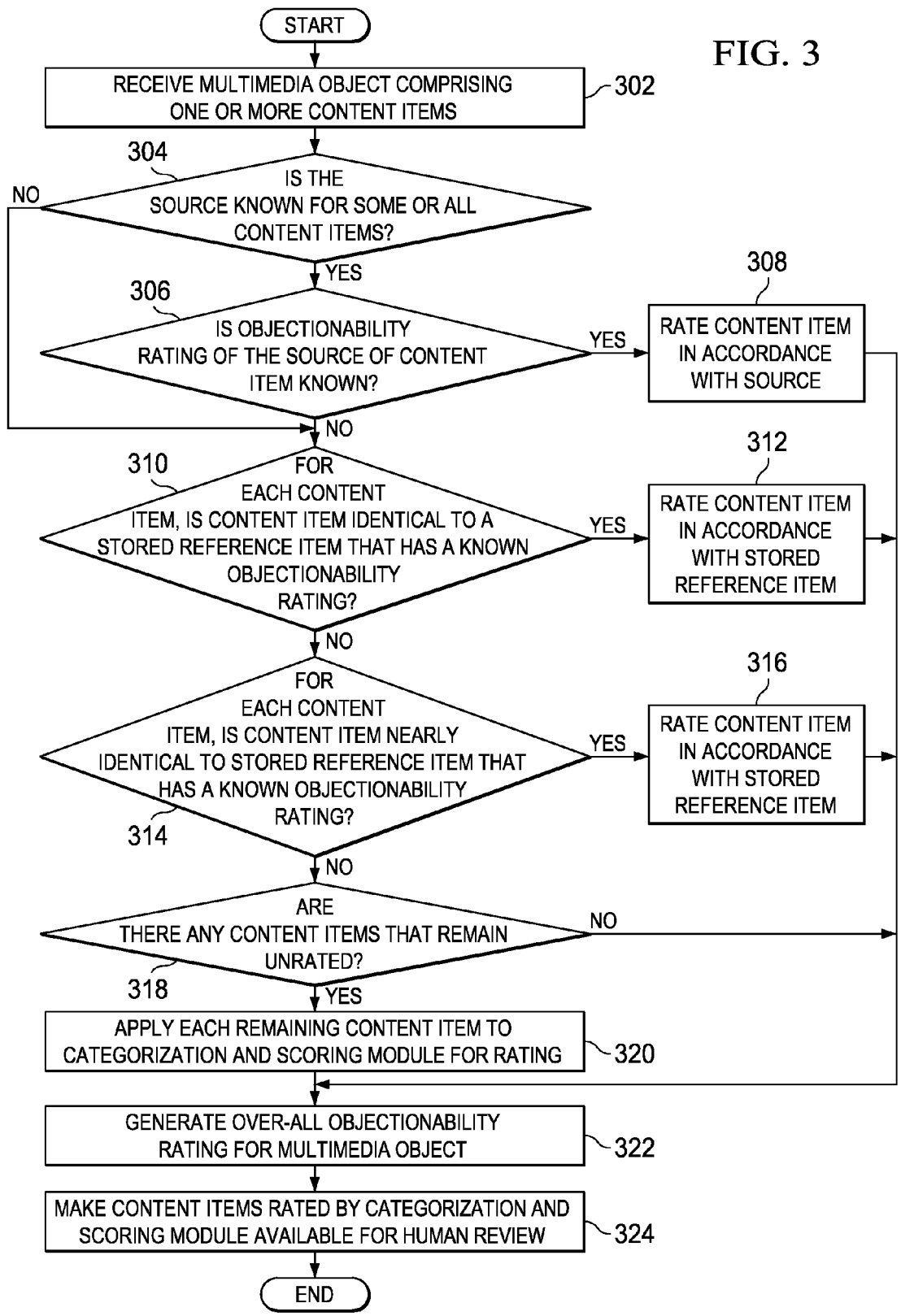
FIG. 3 is a flowchart showing an embodiment of the invention.

Referring to FIG. 3, there are shown principal steps for a method comprising an embodiment of the invention, which may be implemented by system 100 as described above. A multimedia object comprising one or more discrete content items is received at step 302. At step 304, it is determined whether the sources or sites, from which at least some of the content items were respectively acquired, are known. If not, the method proceeds to step 310. However, if the sources of one or more content items are known, it is determined at step 306 whether an objectionability rating is known for each such source. If the result of this determination is positive, a content item derived from the source is given either a "good" or "bad" rating at step 308, in accordance with the rating of the source. Otherwise, the method proceeds to step 310.

Step 310 is directed to querying whether each content item, which remains after steps 304-308, is identical to a stored reference item that has a known objectionability rating. If this is true for a content item, the content item is given either a "good" or "bad" rating at step 312, in accordance with the rating of the stored reference item. The method then proceeds to step 314.

Step 314 is directed to querying whether each content item, which remains after steps 310-312, is nearly identical to a stored reference that has a known objectionability rating. If this is true for a content item, the content item is given either a "good" or "bad" rating at step 316, in accordance with the rating of the stored reference item. The method then proceeds to step 318.

At step 318, it is determined whether or not there are any content items that remain unrated. If not, the method proceeds to step 322. Otherwise, at step 320 each remaining content item is applied to categorization and semantic scoring module 126 or the like, as described above in connection with FIG. 1, in order to be placed in a category 1-N and receive a rating corresponding thereto. At step 322, the ratings provided at step 320 for respective content items are processed collectively, to provide an over-all objectionability rating for the multimedia object. FIG. 3 further shows that ratings provided at steps 308, 312 and 316 may also be used in determining the over-all objectionability rating for the multimedia object. At step 324, content items respectively rated by the categorization and scoring module are made available for review by a specified unit entity.

Figure 4:
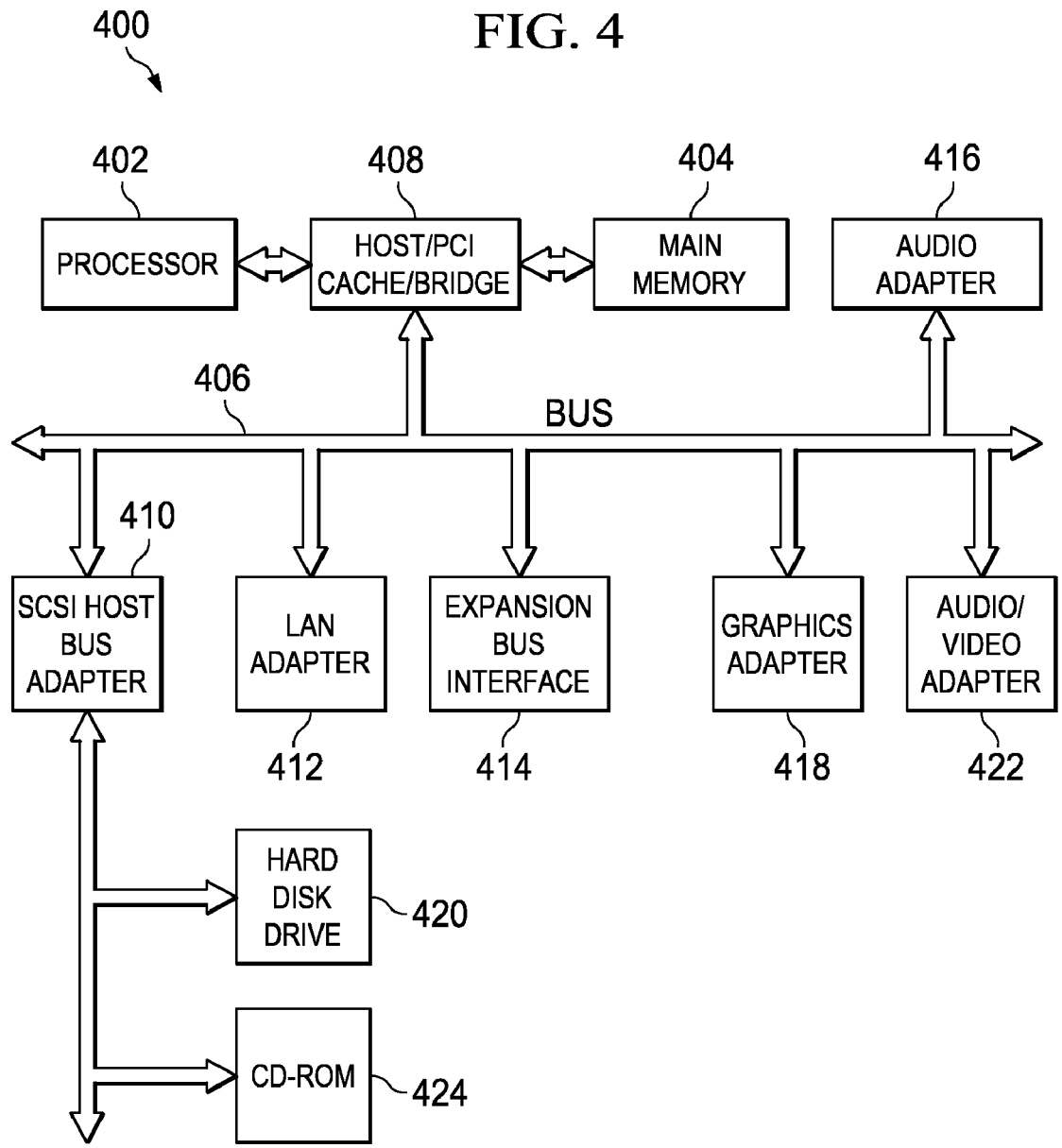
FIG. 4 is a block diagram showing a data processing system that may be used in implementing embodiments of the invention.

Referring to FIG. 4, there is shown a block diagram of a generalized data processing system 400 which may be used in implementing rating and filtering system 100, or other embodiments of the present invention. Data processing system 400 exemplifies a computer, in which code or instructions for implementing the processes of the present invention may be located. Data processing system 400 usefully employs a peripheral component interconnect (PCI) local bus architecture, although other bus architectures such as Accelerated Graphics Port (AGP) and Industry Standard Architecture (ISA) may alternatively be used. FIG. 4 shows a processor 402 and main memory 404 connected to a PCI local bus 406 through a Host/PCI bridge 408. PCI bridge 408 also may include an integrated memory controller and cache memory for processor 402.

Referring further to FIG. 4, there is shown a local area network (LAN) adapter 412, a small computer system interface (SCSI) host bus adapter 410, and an expansion bus interface 414 respectively connected to PCI local bus 406 by direct component connection. Audio adapter 416, a graphics adapter 418, and audio/video adapter 422 are connected to PCI local bus 406 by means of add-in boards inserted into expansion slots. SCSI host bus adapter 410 provides a connection for hard disk drive 420, and also for CD-ROM drive 424.

An operating system runs on processor 402 and is used to coordinate and provide control of various components within data processing system 400 shown in FIG. 4. The operating system may be a commercially available operating system such as Windows XP, which is available from Microsoft Corporation. Instructions for the operating system and for applications or programs are located on storage devices, such as hard disk drive 420, and may be loaded into main memory 404 for execution by processor 402.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for automatically rating a multimedia object comprising one or more discrete content items for objectionable content, wherein said method comprises the steps of:

moving said specified content to one or more filtering stages in a succession of filtering stages, the last stage of said succession being the final stage thereof;

after moving said specified content to a given one of said filtering stages, carrying out a rating procedure to determine whether a rating can be applied to one or more of said content items, and if so, applying a selected rating to each of said one or more content items to indicate whether said one or more content items contain objectionable content or non-objectionable content and filtering out said one or more rated content items to form a subset of remaining content items;

moving the subset of remaining content items to a next stage in said succession after said given stage, when at least one content item of said specified content remains without a rating of objectionable content or non-objectionable content after said rating procedure has been completed at said given stage; and after applying ratings in a final stage in the succession of filtering stages, selectively processing the ratings respectively applied to at least some of said content items, in order to determine an over-all rating of objectionable content for said multimedia object, when none of said content items of said multimedia object remains without a rating, after said rating procedure has been completed at said final stage.

2. The method of claim 1, wherein:

a given content item is rated at one of said stages by extracting semantic information therefrom, and said extracted information is used to apply a rating of objectionable content of said given content item.

3. The method of claim 1, wherein:

when a given content item is moved to said final stage of said succession, said given content item is classified into a given one of a plurality of semantic categories, wherein each category has a predetermined rating and an associated semantic model, and the rating of said given category is assigned to said given content item.

4. The method of claim 3, wherein:

a number of exemplars are used to construct each of said semantic models.

5. The method of claim 3, wherein:

each of said semantic models is constructed using a technique selected from a set of automated techniques, wherein said set includes at least use of statistical models, or use of machine learning models.

6. The method of claim 1, wherein:

each of said content items is rated with respect to a plurality of semantic dimensions, wherein said semantic dimensions include categories respectively pertaining to controversial subject matter, to non-controversial subject matter, and to correlated subject matter.

7. The method of claim 1, wherein:

semantic information is extracted from said content items for rating said content items at respective stages, wherein the information extracted for rating the content item at least one of said stages comprises metadata associated with the content item being rated, and the information for rating a content item at least another of said stages comprises content information associated with the content item being rated.

8. The method of claim 7, wherein:

said extracted information comprises multimedia information that can include at least visual, audio and textual information.

9. The method of claim 7, wherein:

said extracted information comprises multimedia information that is associated with features which include at least color, texture, shape, skin color and graphical appearance.

10. The method of claim 1, wherein:
a given content item is rated at one of said stages in said succession by identifying the source of the given content item, and then rating the given content item on the basis of said identified source.

11. The method of claim 1, wherein:
a given content item is rated at a first stage, by determining that said given content item is identical to a first reference item having a known rating of objectionable content.

12. The method of claim 11, wherein:
said given content item is rated at a second stage, by determining that said given content item is nearly identical to a second reference item, to within a pre-specified limit, wherein said second reference item has a known rating of objectionable content.

13. The method of claim 1, wherein:
said over-all rating of objectionable content is made available for review by a human entity.

14. The method of claim 1, wherein:
said over-all rating of objectionable content is adaptable, selectively, for use by a particular user, or for use in a particular geographical location.

15. A computer program product automatically rating a multimedia object comprising one or more discrete content items for objectionable content, said computer program product comprising:
a computer readable storage medium having computer readable program code stored thereon, the computer readable program code for execution by a computer, comprising:
computer readable program code for moving said specified content to one or more filtering stages in a succession of filtering stages, the last stage of said succession being the final stage thereof;
computer readable program code, responsive to moving said specified content to a given one of said filtering stages, for carrying out a rating procedure to determine whether a rating can be applied to one or more of said content items, and if so, applying a selected rating to each of said one or more content items to indicate whether said one or more content items contain objectionable content or non-objectionable content and filtering out said one or more rated content items to form a subset of remaining content items;
computer readable program code for moving said subset of remaining content items to a next stage in said succession after said given stage, when at least one content item of said specified content remains without a rating of objectionable content or non-objectionable content after said rating procedure has been completed at said given stage; and
computer readable program code for, after applying ratings in a final stage in the succession of filtering stages, selectively processing the ratings respectively applied to at least some of said content items, in order to determine an over-all rating of objectionable content for said multimedia object, when none of said content items of said multimedia object remains without a rating, after said rating procedure has been completed at said final stage.

16. Apparatus for automatically rating a multimedia object comprising one or more discrete content items for objectionable content, wherein said apparatus comprises:
a bus;
a storage device connected to the bus, wherein the storage device contains computer usable code; and
a processing unit connected to the bus, wherein the processing unit executes the computer usable code to move said specified content to one or more filtering stages in a succession of filtering stages, the last stage of said succession being the final stage thereof; responsive to moving said specified to a given one of said filtering stages, carry out a rating procedure to determine whether a rating can be applied to one or more of said content items, and if so, applying a selected rating to each of said one or more content items to indicate whether said one or more content items contain objectionable content or non-objectionable content and filtering out said one or more rated content items to form a subset of remaining content items; move said subset of remaining content items to a next stage in said succession after said given stage, when at least one content item of said specified content remains without a rating after said rating procedure has been completed at said given stage; and, after applying ratings in a final stage in the succession of filtering stages, selectively process the ratings respectively applied to at least some of said content items, in order to determine an over-all rating of objectionable content for said multimedia object, when none of said content items of said multimedia object remains without a rating, after said rating procedure has been completed at said final stage.

17. A computer implemented method for automatically rating a multimedia object comprising one or more discrete content items for objectionable and non-objectionable content, wherein said method comprises the steps of:
receiving a multimedia object comprising a set of content items;
responsive to a determination in a first stage of a plurality of successive filtering stages that metadata about one or more items in the set of content items indicates that the one or more items comprise objectionable or non-objectionable content, assigning a rating to the one or more items in the set comprising objectionable content based on the determination, and filtering out the one or more items from the set, wherein items remaining form a first subset of content items;
responsive to a determination in a second stage of the set of successive filtering stages that one or more items in the first subset of content items comprise content identical to a known content item, assigning a rating to the one or more items in the first subset as being objectionable or non-objectionable based on a rating of the known content item, and filtering out the one or more items from the first subset, wherein items remaining form a second subset of content items;
responsive to a determination in a third stage of the set of successive filtering stages that one or more items in the first subset of content items comprise content substantially identical to a known content item with an objectionable rating, assigning a rating to the one or more items in the second subset as being objectionable based on the rating of the known content item with an objectionable rating, and filtering out the one or more items from the second subset, wherein items remaining form a third subset of content items;
responsive to a determination in a final stage of the set of successive filtering stages that semantic information about one or more items in the third subset of content items indicate that the one or more items comprises non-objectionable content, assigning a rating to each item in the third subset as non-objectionable based on the determination, and filtering out the one or more items from the third subset, wherein items remaining comprise unfiltered items of the multimedia object;

classifying each unfiltered item to one of a plurality of semantic categories;

assigning a rating to each unfiltered item based on an item's assigned semantic category; and determining an overall rating of objectionable content for the multimedia object based on the assigned ratings.

18. The method of claim 17, wherein:

assigning a rating to an item in the set of content items, an item in the first subset, an item in the second subset, an item in the third subset, and an unfiltered item comprises assigning a value representing content in the item determined to be objectionable and a value representing content in the item determined to be non-objectionable.

19. The method of claim 18, wherein:

the value is a percentage of a total content of the multimedia object.

20. The method of claim 17, further comprising:

ranking the unfiltered items based on the rating assigned to each unfiltered item to prioritize the unfiltered items for human review, wherein ranking the unfiltered items comprises assigning a higher priority to the unfiltered items with a higher priority score.

* * * * *